United States Patent [19]
Saidi

[11] Patent Number: 5,576,120
[45] Date of Patent: Nov. 19, 1996

[54] SOLID SECONDARY LITHIUM CELL BASED ON $LI_xV_5O_{13}$ CATHODE MATERIAL

[76] Inventor: M. Yazid Saidi, 492 Capitol Village Cir., San Jose, Calif. 95136

[21] Appl. No.: 447,186

[22] Filed: May 22, 1995

Related U.S. Application Data

[63] Continuation of Ser. No. 184,088, Jan. 19, 1994, abandoned.
[51] Int. Cl.$^6$ ............... H01M 4/58; H01M 4/02
[52] U.S. Cl. .............. 429/218; 429/212; 429/232; 423/593
[58] Field of Search .................. 429/218, 212, 429/232; 423/593

[56] References Cited

U.S. PATENT DOCUMENTS

| | | | |
|---|---|---|---|
| 4,075,397 | 2/1978 | Francis et al. | 429/50 |
| 4,228,226 | 10/1980 | Christian et al. | 429/194 |
| 4,596,752 | 6/1986 | Faul et al. | 429/218 X |
| 4,803,137 | 2/1989 | Miyazaki et al. | 429/218 X |
| 5,039,582 | 8/1991 | Pistoia | 429/218 |
| 5,252,413 | 10/1993 | Alamgir et al. | 429/192 |

FOREIGN PATENT DOCUMENTS 2158987  11/1985  United Kingdom ............... 429/218

OTHER PUBLICATIONS

Tottle, editor, "An Encyclopaedia of Metallurgy and Materials", The Institute of Metals, Macdonald and Evans, publishers, p. 9, no month 1985.

Sax and Lewis, revisors, *Hawley's Condensed Chemical Dictionary*, 1987, Van Nostrand Reinhold, New York pp. 1214–1215 (no month).

K. A. Wilhelmi et al., "Refinement of the Crystal Structure of $V_6O_{13}$", Acta Chemica Scandinavica, vol. 25 (1971) p. 2675 (no month).

K. West et al., "$V_6O_{13}$ as Cathode Material for Lithium Cells", J. Power Sources, vol. 14 (1985) p. 235 (no month).

D. W. Murphy et al., "Vanadium Oxide Cathode Materials for Secondary Lithium Cells" J. Electrochemical Soc., vol. 128 (Mar. 1979) p. 497.

D. W. Murphy et al., "Lithium Incorporation by $V_6O_{13}$ and Related Vanadium (+4, +5) Oxide Cathode Materials" J. Electrochemical Soc., vol. 128 (Oct. 1981) p. 2053.

K. M. Abraham et al., "Rechargeable Lithium/Vanadium Oxide Cells Utilizing 2Me–THF/LiAsF$_6$", J. Electrochemical Soc., vol. 128 (Dec. 1981) p. 2493.

*Primary Examiner*—Prince Willis, Jr.
*Assistant Examiner*—Carol Chaney
*Attorney, Agent, or Firm*—Charles Jew

[57] ABSTRACT

The lithiated vanadium oxide, $Li_xV_5O_{12+y}$ wherein $0.94 \leq x \leq 1.2$ and $0.97 \leq y \leq 1$) its method of making and its use as a cathode active material in electrochemical cells.

16 Claims, 1 Drawing Sheet

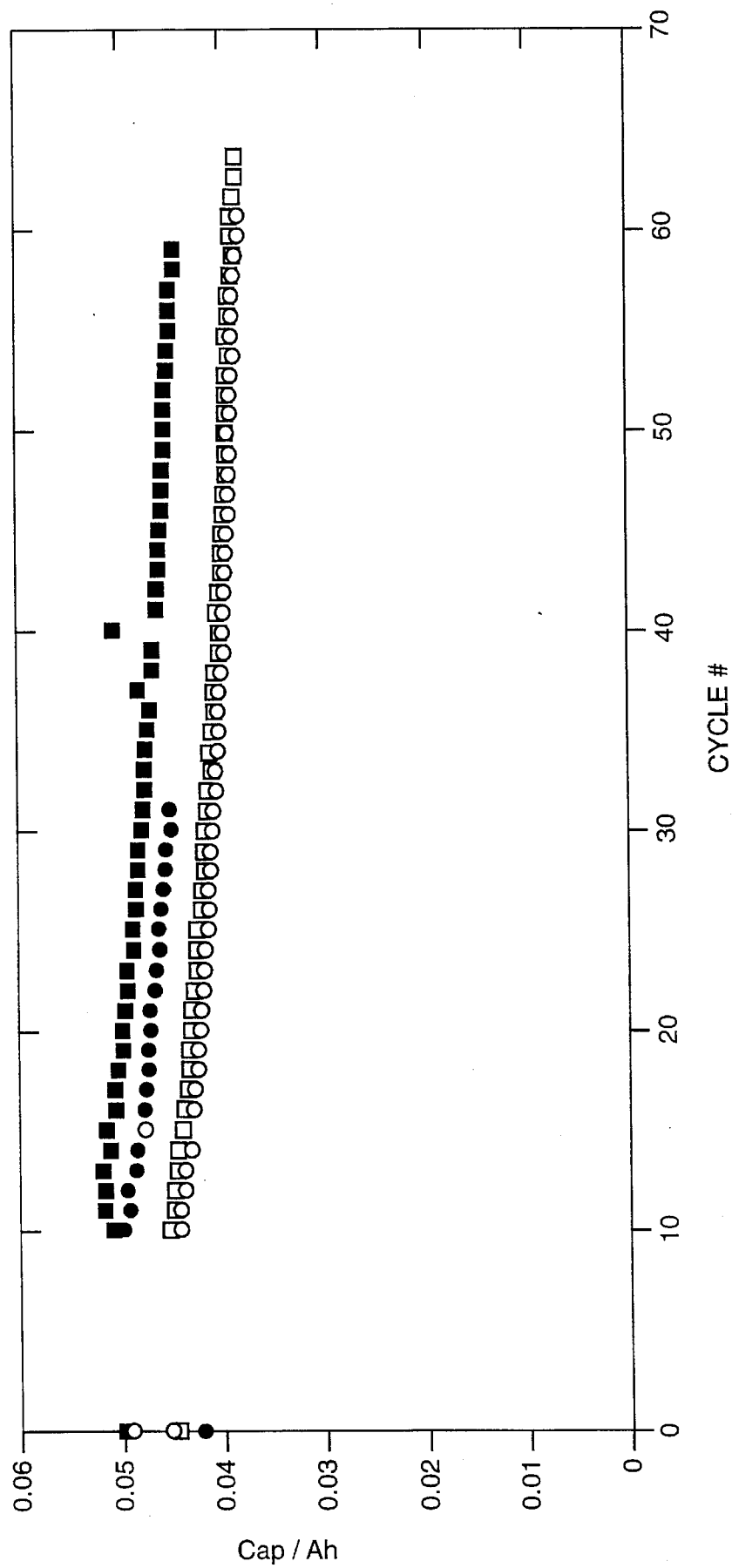
FIG._1

SOLID SECONDARY LITHIUM CELL BASED ON $LI_xV_5O_{13}$ CATHODE MATERIAL

This application is a continuation of application Ser. No. 08/184,088, filed Jan. 19, 1994, now abandoned.

FIELD OF THE INVENTION

The present invention provides a lithiated vanadium oxide which is a cathode active material for use in solid secondary electrochemical cells.

BACKGROUND OF THE INVENTION

Solid state lithium electrochemical cells are known in the art. The cells typically consist of a lithium, or a lithium-based metal anode, a lithium ion-conducting solid electrolyte and a cathode containing a lithium ion insertion electrode material.

An insertion electrode material is capable of acting as a cathode by virtue of its ability to reversibly accommodate lithium ions physically inserted into its structure during the discharge of the cell and subsequently removed therefrom during charging of the cell. Such insertion, or intercalation, electrode materials as $V_2O_5$, $TiS_2$, $V_6O_{13}$, $LiCoO_2$ have satisfactory specific energy densities of about 300–900 Wh/kg and mid-discharge voltages of about 2–3 volts.

Among the transition metal compounds, several transition metal oxides have been very well studied as electrode materials, including $V_2O_5$. However, $V_2O_5$ possesses several drawbacks. The amount of lithium and its ease of insertion in the cathode material depends on the crystallographic lattice structure of the material, and the number and nature of its lattice defects, as well as on the composition of the material. Therefore, materials of the same empirical formula, $VO_y$, will differ remarkably in their properties as cathode material. Solid lithium electrochemical cells using $V_6O_{13}$ as the active cathode material are also well studied. K. West et al., J. Power Sources, 14:235–246 (1985), studied $V_6O_{13}$ as a cathode material for lithium cells using polymeric electrolytes. They found that the lithium insertion reaction was reversible in the composition interval $Li_xV_6O_{13}$, where $0 \leq x \leq 8$. The high stoichiometric energy density for the ultimate composition $Li_8V_6O_{13}$, 890 Wh/kg, is very favorable for battery applications.

P. A. Christian et al., U.S. Pat. No. 4,228,226 suggest that lithiated vanadium oxides of the empirical formula $Li_xVO_{2+y}$ where $0 < y \leq 0.4$, may be prepared chemically by treatment of $VO_{2+y}$ with n-butyllithium in hexane. The use of $Li_xVO_{2+y}$, chemically manufactured as aforesaid, as the positive electrode material, permits the manufacture of cells in the discharged state.

A number of methods of preparation of vanadium oxides of various stoichiometry have been reported, including the production of $V_6O_{13}$ by the thermal decomposition of ammonium vanadate ($NH_4VO_3$) at a controlled rate in an inert atmosphere, such as argon or nitrogen at a temperature of approximately 450° C.; and the production of $V_6O_{13+x}$ as disclosed in U.S. Pat. No. 5,482,697 which is incorporated herein by reference in its entirety.

It would be advantageous to find vanadium oxides of greater discharge capacity and cycling life, as well as higher discharge voltage, at higher drain rates. To that end, the present invention is directed to the new cathode material $Li_xV_5O_{13}$, its method of manufacture and its use in solid secondary lithium electrochemical cells.

SUMMARY OF THE INVENTION

The lithiated vanadium oxide having the nominal stoichiometry $Li_xV_5O_{12+y}$ (where $0.94 \leq x \leq 1.2$ and $0.97 \leq y \leq 1$) is useful as positive electrode material in non-aqueous electrochemical cells where the negative electrode is based on lithium metal.

In an aspect of this invention $Li_xV_5O_{12+y}$ is prepared by the solid state reaction of $LiVO_3$ with vanadium pentoxide. In another aspect of this invention, $Li_xV_5O_{12+y}$ is prepared by the solid state reaction of $Li_2CO_3$ with vanadium pentoxide.

A composite cathode for a solid secondary lithium electrochemical cell in the charged state comprises the lithiated vanadium oxide $Li_xV_5O_{12+y}$ (where $0.94 \leq x \leq 1.2$ and $0.97 \leq y \leq 1$). The composite electrode also normally comprises a solid polymeric electrolyte and an electronic conducting material such as graphite.

In another aspect of the invention, a solid secondary lithium cell comprises the aforesaid composite electrode, a compatible anode based on lithium metal, and interposed therebetween, a solid polymeric electrolyte comprising a solid polymeric matrix, an electrolyte solvent and an inorganic ion salt.

In a further embodiment of the invention, a battery comprises at least two of the herein described solid secondary lithium cells.

BRIEF DESCRIPTION OF THE DRAWING

FIG. 1 plots the capacity of a $LiV_5O_{13}$-cathode cell over many cycles.

DETAILED DESCRIPTION OF PREFERRED EMBODIMENTS OF THE INVENTION

Prior to describing this invention in further detail, the following terms will first be defined.

Definitions

As used herein, the following terms have the following meanings.

The term "stoichiometric" or "stoichiometric compound" refers to a compound wherein the ratio of the number of atoms to each other, as determined by atomic weights, is a ratio of small whole numbers. In "non-stoichiometric compounds" (i.e. certain solids) there are defects in the crystal lattice, or partial replacement of the atoms of one element by those of another, or insertion of atoms.

The term "nominal stoichiometry" is used to refer to non-stoichiometric compounds, because the ratio of the number of atoms to each other is not a ratio of small whole numbers.

The term "empirical formula", as used herein refers to the observed atomic ratio of the elements in the chemical compound relative to vanadium The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. Preferably, the solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. Pat. No. 5,262,253, which patent is incorporated herein by reference in its entirety), and the like as well as mixtures thereof.

Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (19900 and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of an organic carbonate and a glyme compound, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and viscosifier. For example, a composition comprising requisite amounts of the solid matrix forming monomer, salt, organic carbonate/glyme solvent and viscosifier can be applied to a substrate and then cured. Alternatively, the solid matrix forming monomer can be first cured and then dissolved in a suitable volatile solvent. Requisite amounts of the salt, organic carbonate/glyme solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not include a separator as is typical of liquid electrolytes.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are I$^-$, Br$^-$, SCN$^-$, ClO$_4^-$, BF$_4^-$, PF$_6^-$, ASF$_6^-$, CF$_3$COO$^-$, CF$_3$SO$_3^-$, (CF$_3$SO$_2$)$_2$N$^-$, (CF$_3$SO$_2$)$_3$C$^-$, and the like. The inorganic ion salt preferably contains at least one atom selected from the group consisting of Li, Na and K.

The term "electrolyte solvent", or "solvent", refers to any compatible organic solvent present in the solid, single-phase, solvent-containing electrolyte. Known solvents include by way of example organic aprotic solvents, e.g. carbonates such as propylene carbonate, ethylene carbonate, glymes such as dimethoxyethane, diglyme, triglyme, tetraglyme, dimethylsulfoxide, dioxolane, and sulfolane.

The terms "electrochemical cell", or "electrolytic cell", refers to a composite structure containing a positive electrode, a negative electrode, an ion-conducting electrolyte interposed therebetween.

The terms "capacity", "charge capacity" or "discharge capacity" of the cell refers to the total amount of charge the fully charged battery can discharge to a certain final voltage level. It is measured in ampere-hours. It is a measure of the useful charge contained in the battery cell. The initial capacity of the cell is that measured during the first cycle, discharge/recharge, of the cell. Comparison of the average cycle capacity to that of the initial cycle provides a measure for how well the cell maintains a consistent capacity over repeated cycles.

The term "cycle" refers to a consecutive discharge/recharge cycle. The ability of the cell or battery to maintain a useful capacity for many cycles is indicative of the useful life of the cell or battery.

Method of Making Li$_x$V$_5$O$_{13}$

Li$_x$V$_5$O$_{13}$ is prepared by the reaction of lithium carbonate with vanadium pentoxide and by the reaction of lithium vanadate with vanadium pentoxide as in the stoichiometric (x=1) reactions I and II.

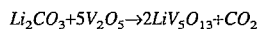

$$Li_2CO_3 + 5V_2O_5 \rightarrow 2LiV_5O_{13} + CO_2 \qquad \text{I}$$

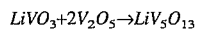

$$LiVO_3 + 2V_2O_5 \rightarrow LiV_5O_{13} \qquad \text{II}$$

The cathode used in the cell of the present invention is one which contains as its cathode active material the lithiated vanadium oxide of empirical formula Li$_x$V$_5$O$_{12+y}$ (where 0.94 ≦ x ≦ 1.2 and 0.97 ≦ y ≦ 1).

The reaction is carried out in the solid state by mixing the powdered reactants in a reaction vessel and applying heat very slowly. The temperature of the mixture is raised at the rate from 1° to 5° C. per minute, for a time sufficient to raise the temperature to about 200°–300° C. The mixture may be held at that temperature for a short period of time, such as one hour, but the temperature must be increased to about 620° C. at the aforementioned rate. The temperature of the reaction mixture is held at about 620° C. for about 24 hours. The reaction mixture is repeatedly annealed for 24 hours at about 620° C. (at least three times) until no significant trace of starting materials are present. The product is cooled, ground and annealed three more times at about 620° C. to complete the reaction. The dried powder may be used directly in the construction of a cathode for a solid electrochemical cell.

EXAMPLES

Example 1. In a solid state synthesis, stoichiometric amounts of lithium carbonate ($Li_2CO_3$) and vanadium pentoxide ($V_2O_5$) were mixed in an open porcelain crucible and heated at temperatures increasing at 5° per minute to 620° C. The product mixture was held at 620° C. for 24 hours. The product was then cooled, reground and annealed three times at 620° C. for 24 hours each time. The composition of the product was confirmed by the weight difference between the reactants and the product. The product was also analyzed for lithium content by atomic absorption potentiometric titration and thermogravimetric analysis. The amount of $CO_2$ evolved was also measure to assess the final composition. The final product was $Li_{0.945}V_5O_{12.97}$.

Example 2. Example 1 was repeated by raising the temperature of the reaction mixture at 5° C. per minute up to 250° C. and held at 250° C. for 1 hour, to decompose the carbonate, then the temperature was raised at 5° C. per minute to 620° C. and held at 620° C. for 24 hours. The reaction mixture was annealed at 620° C. three times, for 24 hours each time. The product was $Li_{0.945}V_5O_{12.97}$.

Example 3. Stoichiometric amounts of lithium carbonate and vanadium oxide were ground intimately for 30 minutes and then compacted under pressure. The mixture was heated at temperatures increasing at 5° C. per minute to 450° C. and held at that temperature for 4 hours. The temperature was then increased to 580° C. at a rate of 2° C. per minute and left at a temperature of 580° C. for 8 hours. This procedure was repeated three times. The product was then cooled at 10° C. per minute to room temperature. Once cooled, the procedure was repeated after regrinding the product. The temperature used for the second step of the reaction was 620° C. Chemical analysis of the material showed a nominal composition of $Li_{1.12}V_5O_{13.0}$.

The powder x-ray diffraction pattern of the product of Example 1 is given in Table I.

TABLE I

| d(obs)Å | I(obs) |
| --- | --- |
| 7.22 | VS |
| 6.35 | VS |
| 3.42 | M |
| 3.21 | S |
| 2.94 | M |

The cathode active material may be mixed or diluted with any other cathode active material, electronically conducting material, solid electrolyte or compatible inert material. The cathode is readily fabricated from individual or mixed cathode active materials by methods known to the art. Such compatible cathode active materials well known in the art include, by way of example, manganese oxide, molybdenum oxides, vanadium oxides, sulfides of titanium, molybdenum and niobium, lithiated cobalt oxides, lithiated nickel oxides, lithiated manganese oxides, chromium oxides, copper oxides, and the like, including non-stoichiometric vanadium oxides as disclosed in U.S. Pat. No. 5,482,697, which is incorporated by reference herein, in its entirety. Compatible electronically conductive materials include conductive polymers characterized by a congregated network of double bonds, binders, such as polymeric binders which form under pressure a positive cathodic plate, graphite, powdered carbon, powdered nickel carbon, metal particles and the like. Suitable conductive polymers include polypyrrole, polyacetylene polyazine, polyaniline, polythiophene and the like.

In a preferred embodiment, the cathode is prepared from a cathode paste which comprises from about 35 to 65 weight percent of a compatible cathodic material; from about 1 to 20 weight percent of an elctroconductive agent; from about 0 to 20 weight percent of polyethylene oxide having a number average molecular weight of at least 100,000; from about 10 to 50 weight percent of solvent; and from about 5 weight percent to about 30 weight percent of a solid matrix forming monomer or partial polymer thereof. (All weight percents are based on the total weight of the cathode.)

The cathode paste is typically spread onto a suitable support such as a current collector and then cured by conventional methods to provide for a solid positive cathodic plate. The cathode (excluding the support) has a thickness of about 20 to about 150 microns, preferably 75 microns.

Current collectors are well known in the art, some of which are commercially available. A particularly preferred current collector for the cathode is a roughened nickel (electrolytically deposited nickel) on nickel current collector available as CF18/NIT from Fukuda Metal Foil & Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

The solid, solvent-containing electrolyte can be preferably prepared by combining, for example, a solid matrix-forming monomer with a salt, the solvent mixture and an inorganic ion salt. The resulting composition can then be uniformly coated onto a suitable substrate, e.g., aluminum foil, a glass plate, a lithium anode, a cathode, interposed between an anode and a cathode, and the like, by means of a roller, a doctor blade, a bar coater, a silk screen or spinner to obtain a film of this composition or its solution prior to curing. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns (μm). More preferably, the solid, solvent-containing electrolyte may have a thickness of from about 25 to about 250 microns. The final thickness will depend on the particular application.

The electrolyte composition typically comprises from about 5 to about 25 weight percent salt, based on the total weight of the electrolyte; preferably from about 10 to 20 weight percent; and even more preferably from about 10 to about 15 weight percent. The electrolyte composition typically comprises from about 40 to about 80 weight percent solvent, based on the total weight of the electrolyte; preferably from about 60 to about 80 weight percent; and even more preferably about 70 weight percent.

The solid electrolyte composition typically comprises from about 5 to about 30 weight percent of solid polymeric matrix, based on the total weight of the electrolyte; preferably from about 10 to about 20 weight percent.

The electrolyte composition can be cured by conventional methods to from a solid film. For example, when the solid matrix forming monomer contains a reactive double bond, suitable curing methods include heating, irradiation with UV radiation, irradiation with electron beams (EB), and the like. When the composition is cured by heating or UV radiation, the composition preferably contains an initiator. For example, when curing is by heating, the initiator is typically a peroxide such as benzoyl peroxide, methyl ethyl ketone peroxide, diisopropyl peroxycarbonate, and the like. When curing is by UV radiation, the initiator is typically benzophenone, Darocur 1173 (Geigy, Ardsly, N.Y.), and the like.

The initiator is generally employed in an amount sufficient to catalyze the polymerization reaction. preferably, the initiator is employed at up to about 1 weight percent, based on the weight of the solid matrix forming monomer. When curing is by EB treatment, an initiator is not required.

In an alternative embodiment, the solid polymeric matrix, e.g., formed by polymerization of a solid matrix forming monomer, can be dissolved in a suitable volatile solvent and the requisite amounts of, the salt and solvent mixture are then added. The mixture can then be applied onto a suitable substrate, e.g., the surface of the cathode opposite to the current collector, an anode, interposed between an anode and a cathode, and the like, in a manner set forth above. The volatile solvent can be removed by conventional techniques and the composition cured, which should provide for a solid electrolyte. Suitable volatile solvents preferably have a boiling point of less than 85° C. and more preferably between about 45° C. and about 85° C. Particularly preferred volatile solvents are aprotic solvents. Examples of suitable volatile solvents include acetonitrile, tetrahydrofuran, and the like. However, acetonitrile is not preferred if it is to contact a metallic anode.

The resulting solid electrolyte should be a homogeneous, single-phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in mono-, di-, tri- and higher functional acrylate monomers as well as in the urethane acrylate prepolymers, are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a current collector with a cathode paste containing a cathodic material, a conducting polymer, a solid matrix forming monomer, a solvent and curing composition. The cathode can then be coated with an electrolyte composition. The electrolyte composition can then be cured to provide for a solid electrolyte on the cathodic surface. The anode, e.g., a lithium foil, can then be laminated to this composite product in such a way that the solid electrolyte is interposed between the lithium foil and the cathode. In this manner, the cathode conducting polymer can increase the conductivity of the cathode components and improve the coatability of the cathode paste, to provide a solid cathode and electrolyte cell having improved properties.

Methods for preparing solid electrolytes and electrolytic cells are also set forth in U.S. Pat. Nos. 4,830,939 and 4,925,751 which are incorporated herein by reference in their entirety.

Utility

Cyclic voltammetry of solid secondary lithium electrochemical cells containing a cathode based on $Li_xV_5O_{13}$ cathode active material show several peaks, the largest of which is located at approximately 2.8 volts. For comparison, cyclic voltammetry of a comparable cell containing a cathode based on $V_6O_{13}$ cathode active material also shows several peaks, but the largest is located at approximately 2.2 volts. These $V_6O_{13}$ cathode results confirm the findings of K. West et al., J. Power Sources, ibid. By means of having higher capacity at higher voltage, the superiority of the $Li_xV_5O_{13}$ cathode-cell is demonstrated. As a consequence, the cell of the present invention demonstrates a higher average voltage.

FIG. 1 illustrates the cycling of a series of solid secondary lithium electrochemical cells containing a cathode based on $LiV_5O_{13}$ cathode-active material. The cells were constructed substantially as described in the following examples. The data demonstrate that the $LiV_5O_{13}$ cells undergo more than 50 discharge/recharge cycles with only fractional loss of charge capacity.

The following hypothetical examples are offered to illustrate the present invention and should not be construed in any way as limiting its scope.

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

8.44 weight percent of carbon powder (Shawinigan Black™—available from Chevron Chemical Company, San Ramon, Calif.)

33.76 weight percent of a 25 weight percent solution of polyacrylic acid (a reported average molecular weight of about 90,000, commercially available from Aldrich Chemical Company—contains about 84.4 grams polyacrylic acid and 253.2 grams water)

57.80 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to pro-vide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining about 90 weight percent $LiV_5O_{13}$ and about 10 weight percent of carbon (from Chevron Chemical Company, San Ramon, Calif. under the tradename of Shawinigan Black™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $LiV_5O_{13}$.

Specifically, 171.6 grams of a 4:1 weight ratio of propylene carbonate: triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $LiV_5O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| Propylene Carbonate | 52.472 weight percent |
|---|---|
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif.) and then proceed to step 4.

2. At room temperature, <30° C., add the urethane acrylate to the solvent prepared in step 2. Stir at 300 rpm until the resin is completely dissolved. The solution should be clear and colorless.

3. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

4. After final addition of the polyethylene oxide film forming agent, stir an additional 30 minutes to ensure that the film forming agent is substantially dispersed.

5. Heat the mixture to 68° C. to 75° C. and stir until the film forming agent has melted and the solution has become transparent to light yellow in color. Optionally, in this step, the mixture is heated to 65° C. to 68° C.

6. Cool the solution produced in step 6 and when the temperature of the solution reaches 40° C., add the $LiPF_6$ salt very slowly making sure that the maximum temperature does not exceed 55° C.

7. After the final addition of the LiPF$_6$ salt, stir for an additional 30 minutes, degas, and let sit overnight and cool.

8. Filter the solution through a sintered stainless steel screen having a pore size between 1 and 50 µm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 µm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 µm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

While the invention has been described in terms of various preferred embodiments, the skilled artisan will appreciate the various modifications, substitutions, omissions and changes which may be made without departing from the spirit thereof. The descriptions of the subject matter in this disclosure are illustrative of the invention and are not intended to be construed as limitations upon the scope of the invention.

What is claimed is:

1. A composite cathode comprising a lithiated vanadium oxide composition, a solid polymeric matrix, and a carbon wherein the lithiated vanadium oxide composition is prepared by a process comprising the steps of:
   (a) mixing reactants that comprise $V_2O_5$ and a lithium compound that is either $LiVO_3$ or $Li_2CO_3$ provided that when the lithium compound is $LiVO_3$ the mole ratio of $V_2O_5$ to $LiVO_3$ is about 2 to 1 and when the lithium compound is $Li_2CO_3$ the mole ratio of $V_2O_5$ to $Li_2CO_3$ is about 5 to 1;
   (b) heating the reactants to an elevated temperature of about 620° C.; and
   (c) maintaining the reaction mixture at said elevated temperature until no significant trace of the reactants is present.

2. The composite cathode of claim 1 wherein step (b) comprises heating the reactants to the elevated temperature at a rate of 1° to 5° C. per minute.

3. The composite cathode of claim 1 wherein step (b) comprises the steps of:
   (i) heating the reactants to a temperature of about 200° to 300° C. and maintaining the reaction mixture at this temperature for approximately 1 hour; and
   (ii) thereafter heating the reaction mixture to the elevated temperature; wherein the reactants and reaction mixture in steps (i) and (ii) are heated at a rate of 1° to 5° C. per minute.

4. The composite cathode of claim 3 further comprising step (d) of cooling the reaction mixture to room temperature and step (e) of heating the reaction mixture to the elevated temperature; and, if necessary, repeating steps (d) and (e) until no significant trace of the reactants is present.

5. The composite cathode of claim 1, wherein the lithium compound is $Li_2CO_3$.

6. The composite cathode of claim 5 wherein step (b) comprises heating the reactants to the elevated temperature at a rate of 1° to 5° C. per minute.

7. The composite cathode of claim 5 wherein step (b) comprises the steps of:
   (i) heating the reactants to a temperature of about 200° to 300° C. and maintaining the reaction mixture at this temperature for approximately 1 hour; and
   (ii) thereafter heating the reaction mixture to the elevated temperature; wherein the reactants and reaction mixture in steps (i) and (ii) are heated at a rate of 1° to 5° C. per minute.

8. The composite cathode of claim 7 further comprising step (d) of cooling the reaction mixture to room temperature and step (e) of heating the reaction mixture to the elevated temperature; and, if necessary, repeating steps (d) and (e) until no significant trace of the reactants is present.

9. A solid electrochemical cell comprising an anode, a cathode, and interposed therebetween a solid electrolyte comprising a solid polymeric matrix, a solvent electrolyte, and an inorganic salt, wherein the cathode comprises a lithium vanadium oxide composition prepared by a process comprising the steps of:
   (a) mixing reactants that comprise $V_2O_5$ and a lithium compound that is either $LiVO_3$ or $Li_2CO_3$ provided that when the lithium compound is $LiVO_3$ the mole ratio of $V_2O_5$ to $LiVO_3$ is about 2 to 1 and when the lithium compound is $Li_2CO_3$ the mole ratio of $V_2O_5$ to $Li_2O_3$ is about 5 to 1;
   (b) heating the reactants to an elevated temperature or about 620° C.; and
   (c) maintaining the reaction mixture at said temperature until no significant trace of the reactants is present.

10. The electrochemical cell of claim 9 wherein step (b) comprises heating the reactants to the elevated temperature at a rate of 1° to 5° C. per minute.

11. The electrochemical cell of claim 9 wherein step (b) comprises the steps of:
    (i) heating the reactants to a temperature of about 200° to 300° C. and maintaining the reaction mixture at this temperature for approximately 1 hour; and
    (ii) thereafter heating the reaction mixture to the elevated temperature; wherein the reactants and reaction mixture in steps (i) and (ii) are heated at a rate of 1° to 5° C. per minute.

12. The electrochemical cell of claim 11 further comprising step (d) of cooling the reaction mixture to room temperature and step (e) of heating the reaction mixture to the elevated temperature; and, if necessary, repeating steps (d) and (e) until no significant trace of the reactants is present.

13. The electrochemical cell of claim 9 wherein the lithium compound is $Li_2CO_3$.

14. The electrochemical cell of claim 13 wherein step (b) comprises heating the reactants to the elevated temperature at a rate of 1° to 5° C. per minute.

15. The electrochemical cell of claim 13 wherein step (b) comprises the steps of:
    (i) heating the reactants to a temperature of about 200° to 300° C. and maintaining the reaction mixture at this temperature for approximately 1 hour; and (ii) thereafter heating the reaction mixture to the elevated temperature; wherein the reactants and reaction mixture in steps (i) and (ii) are heated at a rate of 1° to 5° C. per minute.

16. The electrochemical cell of claim 15 further comprising step (d) of cooling the reaction mixture to room temperature and step (e) of heating the reaction mixture to the elevated temperature; and, if necessary, repeating steps (d) and (e) until no significant trace of the reactants is present.

* * * * *